Figure 1:
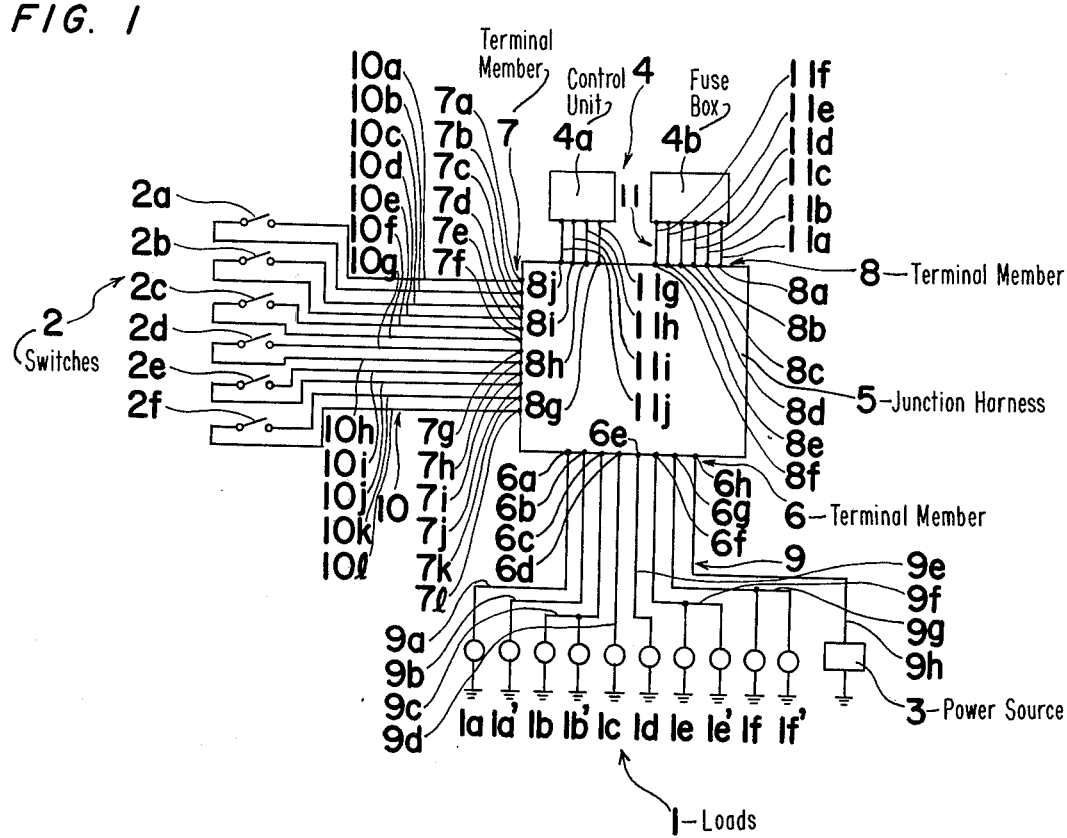

United States Patent [19]

Sumida

[11] 4,122,357
[45] Oct. 24, 1978

[54] WIRING SYSTEM FOR MOTOR VEHICLE

[75] Inventor: Shizuo Sumida, Hiroshima, Japan

[73] Assignee: Toyo Kogyo Co., Ltd., Japan

[21] Appl. No.: 766,510

[22] Filed: Feb. 7, 1977

[30] Foreign Application Priority Data

Feb. 13, 1976 [JP] Japan .................. 51/15036

[51] Int. Cl.² .............................. H02G 3/00
[52] U.S. Cl. ........................ 307/10 R; 307/10 LS; 174/72 A
[58] Field of Search ............... 307/10 R, 10 LS, 147, 307/9, 11; 174/72 A; 361/428; 180/82 R

[56] References Cited

U.S. PATENT DOCUMENTS 3,697,767  10/1972  Fioravanti .................. 307/10 R

FOREIGN PATENT DOCUMENTS 2,544 of 1903 United Kingdom .................. 174/72

Primary Examiner—Robert K. Schaefer
Assistant Examiner—Morris Ginsburg
Attorney, Agent, or Firm—Wenderoth, Lind & Ponack

[57] ABSTRACT

The present invention is an electrical wiring system for incorporation into a motor vehicle which includes a junction harness having numerous terminals for individual connection with corresponding terminals of various loads, switches, the power source and units for electrical appliances of the motor vehicle through independent single wires so that complicated interconnections between such loads, switches, the power source and units for electrical appliances are collectively made within the junction harness for simplification of wiring.

2 Claims, 4 Drawing Figures

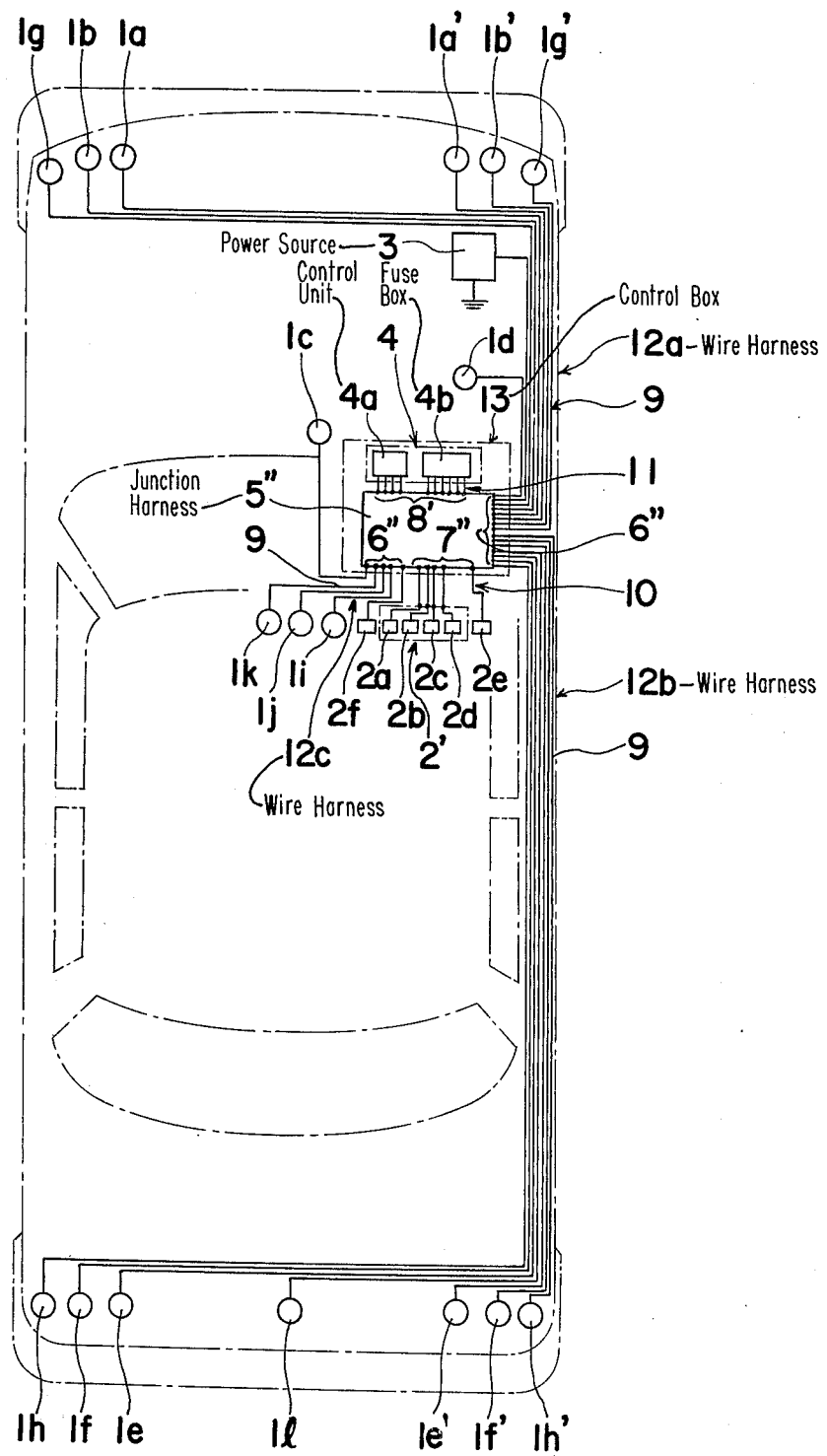

WIRING SYSTEM FOR MOTOR VEHICLE

The present invention relates to a motor vehicle and more particularly, to an electrical wiring system for a motor vehicle in which complicated electrical connections interconnecting various loads, switches, power source units for electrical equipment or appliances and the like are effected collectively at a junction harness or junction block for the simplification of the electrical wiring of motor vehicles.

Commonly, in the installation of electrical equipment or appliances on a motor vehicle, the installation positions tend to be limited in many cases from the viewpoint of ease in handling the functions of such electrical appliances. For example, various switches are normally provided in the vicinity of the driver's seat, while headlights are inevitably disposed at the front of the motor vehicle. Accordingly, for interconnecting the electrical appliances installed at various parts of the motor vehicle, it has conventionally been a general practice to distribute the main wiring throughout the motor vehicle, with wiring further branching out from the main wiring for connection with these respective electrical appliances. Furthermore, whenever other electrical appliances are newly added or part of the wiring for the electrical appliances is to be changed, for example, through remodeling of the motor vehicle arising from development of a new series of cars, further divergence of the wiring from the main wiring is undesirably involved. Thus, in the conventional wiring systems, the wiring tends to be more diverging and complicated as the number of the electrical appliances to be installed in the motor vehicle increases, with wires from wiring harnesses or wiring assemblies being distributed through the vehicle body for interconnecting the respective electrical appliances in an extremely complicated manner.

The arrangement in the conventional wiring system as described above results in such disadvantages that, even when an electrical appliance may be connected to a near-by terminal, connections must in some cases be made in a round-about way to the main wirings remote from the electrical appliance. Consequently once the particular electrical appliance goes out of order, for example, due to breakage, poor contact or the like in the wires, it is necessary to check numerous spots to trouble shoot because of the complicated diverging wiring. Thus the detection of defective spots is extremely inefficient. Additionally, following the recent demand for motor vehicles suited to improvements of social environment such as purification of exhaust gases, reduction of fuel consumption and the like, installation of units for electrical control as well as those for mechanical control has appreciably increased, with a consequent increase in electrical appliances to be mounted on the motor vehicle as a whole. This further hinders efficient detection of causes of problems during trouble shooting and, in some cases, results in difficulty locating the electrically detective portions, for example, due to breakage or poor contact of the wiring.

In order to simplify the arrangement of small wire harnesses or wire assemblies diverging from large wire harnesses, and that of wires branching out from such wire harnesses, there has conventionally been proposed to employ the multiplex transmission system in which a single wire carries a plurality of signal currents. These are broadly divided into time division systems and frequency division systems.

The conventional arrangement as described above, however, has serious disadvantages. In the time division system, crystal oscillators are required for generating the switching pulses. In the frequency division system, filters are required for selectively allowing a predetermined frequency to pass therethrough and to be blocked thereby. This results in a high cost of the apparatus involved, with the amount of information that can be transmitted over the single wire being undesirably limited.

Accordingly, an essential object of the present invention is to provide an improved wiring system for use in a motor vehicle in which the wires to be distributed outside of a junction harness or junction block are made independent of each other to avoid diverging thereof from various portions of wiring harnesses for simplification of the wiring system and improved efficiency in trouble shooting of wires and wire harnesses, with a consequent facilitation of replacing and repairing of the wires and wire harnesses and of the electrical appliances connected thereto.

Another important object of the present invention is to provide an improved wiring system of the above described type in which a control box is incorporated for collectively disposing therein the junction harness and other units for the electrical appliances, so that the wire harness is simplified and made compact for facilitation of repairing and servicing work.

A further object of the present invention is to provide an improved wiring system of the above described type which is simple in structure and readily incorporated into motor vehicles at low cost.

In accomplishing these and other objects, according to one preferred embodiment of the present invention, the wiring system for incorporation into a motor vehicle includes at least one junction harness or junction block having numerous terminals for individual connection with corresponding terminals of various loads, switches and power source units for electrical appliances through independent single wires so that complicated interconnections between the respective loads, switches, power source units for electric appliances and the like are collectively effected at the junction harness. In other words, the wires to be distributed on the outside of the junction harness are made independent of each other to avoid connection of these wires to various parts of the wire harness in a diverging manner. Thus the wiring system is markedly simplified, resulting not only in improvements in the efficiency of trouble shooting of the wires and wire harnesses, but in a marked facilitation of replacement and repairing of electric appliances connected thereto, with a substantial elimination of the disadvantages inherent in the conventional wiring systems.

Figure 2:
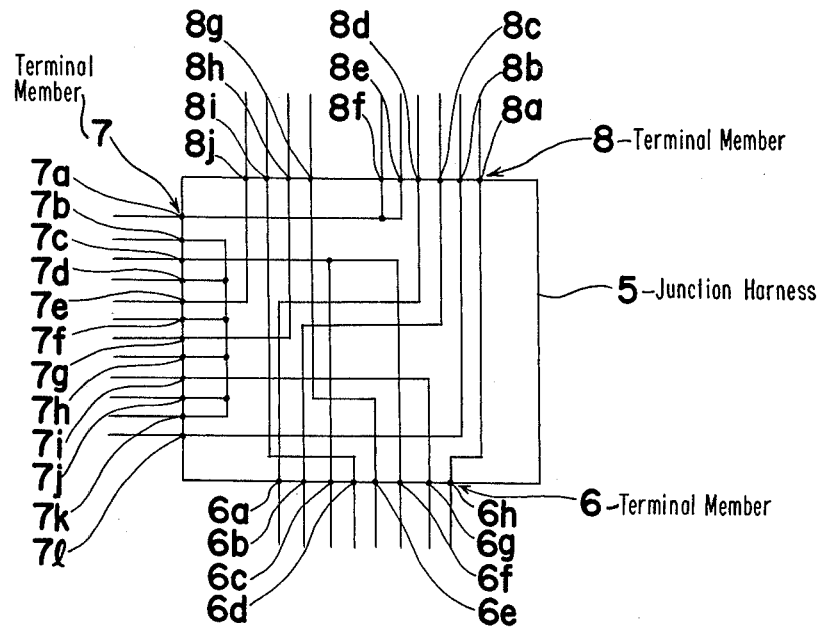
Figure 3:
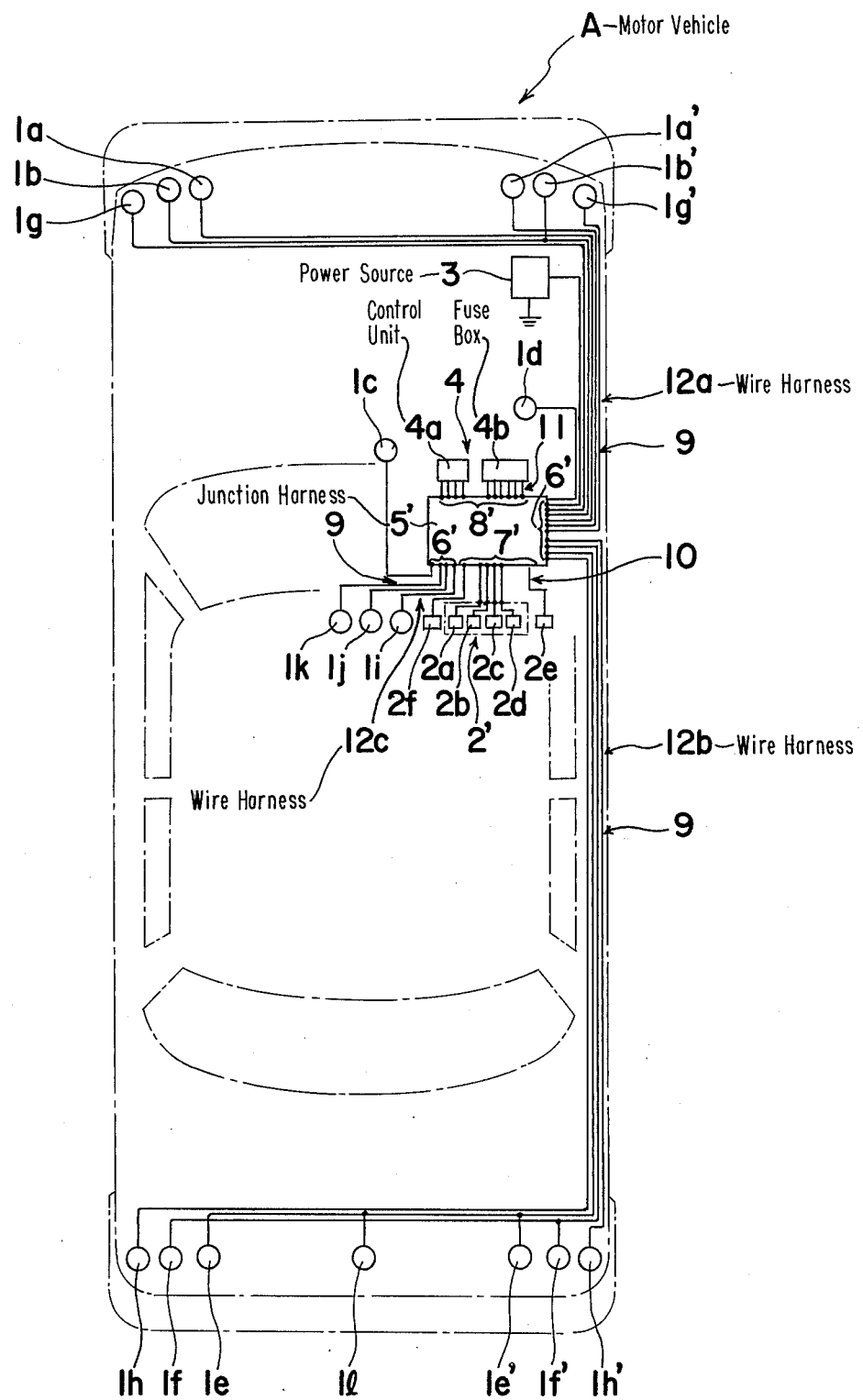

These and other objects and features of the present invention will become apparent from the following description taken in conjunction with the preferred embodiment thereof with reference to the attached drawings, in which;

FIG. 1 is a schematic wiring diagram explanatory of a wiring system according to one preferred embodiment of the present invention, FIG. 2 is a diagram similar to FIG. 1, but particularly shows wiring in the junction harness employed in the wiring system of FIG. 1, FIG. 3 is a schematic top plan view of a motor vehicle in which the wiring system of FIG. 1 is incorporated, and FIG. 4 is a view similar to FIG. 3, but particularly shows a modification thereof.

Before the description of the present invention proceeds, it is to be noted that like parts are designated by like reference numerals throughout several views of the accompanying drawings.

Referring now to the drawings, there is shown in FIG. 1 a wiring system according to one preferred embodiment of the present invention which includes a junction harness or junction block 5, for example, of rectangular configuration provided with an electrical terminal member 6 having terminals $6a$, $6b$, $6c$, $6d$, $6e$, $6f$, $6g$ and $6h$ at its first side, a terminal member 7 having terminals $7a$, $7b$, $7c$, $7d$, $7e$, $7f$, $7g$, $7h$, $7i$, $7j$, $7k$ and $7l$ at its second side, and a terminal member 8 having terminals $8a$, $8b$, $8c$, $8d$, $8e$, $8f$, $8g$, $8h$, $8i$ and $8j$ at its third side, respectively. Schematically shown around the junction harness 5 are a group of loads 1 for the motor vehicle including, for example, a pair of headlights $1a$ and $1a'$, front side lights $1b$ and $1b'$, a wiper motor $1c$, a washer motor $1d$, a pair of tail lights $1e$ and $1e'$ and stop lights $1f$ and $1f'$ which correspond to the terminal member 6, a group of normally open switches 2 for operating the loads 1 including, for example, a switch $2a$ for the headlights $1a$ and $1a'$, a switch $2b$ for the side lights $1b$ and $1b'$ and taillights $1e$ and $1e'$, a wiper switch $2c$ for the wiper motor $1c$, a washer switch $2d$ for the washer motor $1d$, a switch $2e$ for the stop lights $1f$ and $1f'$ and a key switch $2f$ which correspond to the terminal member 7, a power source 3 for the motor vehicle, and unit 4 for electrical appliances which further includes a control unit $4a$ incorporating therein wiper relays, intermittent units and the like (not shown), and a fuse box $4b$, with the unit 4 corresponding to the terminal member 8 of the junction harness 5. The terminals $6a$ to $6h$, $7a$ to $7l$ and $8a$ to $8j$ for the terminal members 6, 7 and 8 are interconnected within the junction harness 5 in a complicated manner mentioned later with reference to FIG. 2. Each of the terminals for the loads $1a$ to $1f'$, switches $2a$ to $2f$, units $4a$ and $4b$ and the power source 3 is connected one by one to each of the corresponding terminals $6a$ to $6h$, $7a$ to $7l$ and $8a$ to $8j$ through a single wire of wire assemblies 9, 10 and 11 except terminals for the electric appliances which may be regarded as one common load, such as the side lights $1b$ and $1b'$ or tail lamps $1e$ and $1e'$. More specifically, the terminals for the loads $1a$ and $1a'$, $1c$ and $1d$ are respectively connected to the corresponding terminals $6a$, $6b$, $6d$ and $6e$ of the terminal member 6 through independent wires $9a$, $9b$, $9d$ and $9e$, while the loads $1b$ and $1b'$, $1e$ and $1e'$ and $1f$ and $1f'$ are first coupled in respective pairs and then connected to the terminal $6c$, $6f$ and $6g$ of the terminal member 6 through independent wires $9c$, $9f$ and $9g$ for simplification of the wiring, with the power source 3 being connected to the terminal $6h$ through a single wire $9h$. Meanwhile, the terminals for stationary contacts of the switches $2a$ to $2f$ are respectively connected to corresponding terminals $7a$, $7c$, $7e$, $7g$, $7i$ and $7k$ through independent wires $10a$, $10c$, $10e$, $10g$, $10i$ and $10k$, while the terminals for contactors of the switches $2a$ to $2f$ are respectively connected to the corresponding terminals $7b$, $7d$, $7f$, $7h$, $7j$ and $7l$ of the terminal 7 through independent wires $10b$, $10d$, $10f$, $10h$, $10j$ and $10l$ of the wire assembly 10. Similarly, the terminals for the unit $4a$ and the fuse box $4b$ for the unit 4 are respectively connected to the corresponding terminals $8a$, $8b$, $8c$, $8d$, $8e$, $8f$, $8g$, $8h$, $8i$ and $8j$ of the terminal member 8 through independent wires $11a$, $11b$, $11c$, $11d$, $11e$, $11f$, $11g$, $11h$, $11i$ and $11j$ as shown. Accordingly, the wires $9a$ to $9h$, $10a$ to $10l$ and $11a$ to $11j$ are independent of each other at the outside of the junction harness 5 without any intermediate connections therebetween.

Referring particularly to FIG. 2 showing one example of interconnections between the terminals of the terminal members 6, 7 and 8 within the junction harness 5, the terminal $6a$ of the terminal member 6 is connected to the terminal $8d$ of the terminal member 8, the terminal $6b$ to the terminal $8c$, the terminal $6c$ to a common junction between the terminal $6f$ and the terminal $7c$ of the terminal member 7, the terminal $6d$ to the terminal $8i$ of the terminal member 8, the terminal $6e$ to the terminal $8g$, the terminal $6g$ to the terminal $7i$, and the terminal $6h$ to the terminal $8a$, while the terminal $7a$ of the terminal member 7 is connected to a common junction between the terminals $8e$ and $8f$ of the terminal member 8, the terminal $7b$ to the terminals $7d$, $7f$, $7h$, $7j$ and $7k$ of the same terminal member 7, the terminal $7e$ to the terminal $8j$, the terminal $7g$ to the terminal $8h$, and the terminal $7l$ to the terminal $8b$ of the terminal member 8 each of the connections being made, for example, with a lead wire.

It should be noted here that the junction harness 5 of the above described type is very effective for the simplification of the wirings and electrical connections involved therein and consequently for efficient trouble shooting in the case of problems.

It should also be noted that the configuration of the junction harness 5, the number of the terminal members and the terminals provided thereon, the kinds of electrical appliances to be connected to said terminals, and the interconnections between the terminals within the junction harness 5 are not limited to those described with reference to FIGS. 1 and 2, but may be modified in various ways depending on the necessity, for example, as shown in FIGS. 3 and 4 referred to later. The interconnections between the terminals within the junction harness 5 described as effected with simple lead wires in the foregoing embodiment may, for example, be replaced by interconnections of printed circuit wiring or integrated circuit wiring and the like.

Referring now to FIG. 3 showing one example of the most simplified application of the wiring system of the present invention to a bonnet type motor vehicle A, the various loads 1 for the motor vehicle A include the headlights $1a$ and $1a'$, the front side lights $1b$ and $1b'$, turn signal lights $1g$ and $1g'$ which are respectively disposed in pair on opposite sides of the front portion of the vehicle A, the wiper motor $1c$, washer motor $1d$, left and right winkers $1i$ and $1j$ and beam light $1k$ which are provided in an instrument panel (not shown) or thereabouts, the tailights $1e$ and $1e'$, stop lights $1f$ and $1f'$, and turn signal lights in $1h$ and $1h'$ which are disposed in pair on opposite sides of the rear portion of the vehicle A, a license light $1l$ also disposed at a central portion of the vehicle rear portion, while the switches 2 include a combination switch 2' having the light switches $2a$ and $2b$, wiper switch $2c$, and washer switch $2d$ incorporated therein, the stop switch $2e$ and the key switch $2f$.

The junction harness 5' is disposed at a position in the vicinity of the power source 3 and where many wires are distributed, for example, at the back of the engine compartment (not shown) or within the instrument panel (not shown), while the unit 4 shown forward of the junction harness 5' in FIG. 3 includes the fuse box 4b, and the control unit 4a which houses, for example, a lamp checker, a horn relay, a flasher unit, a reciper relay, an intermittent unit and the like (not shown). The junction harness 5' is provided with the terminals 6' for the power source 3 and various loads 1, terminals 7' for the switches 2, and terminals 8' for the unit 4, with the complicated interconnections of the terminals 6', 7' and 8' of the harness 5' being effected within the harness 5'. The terminals of the loads 1, switches 2, power source 3 and unit 4 are each connected to a corresponding one of the terminals of the junction harness 5' through the independent single wire of the wire assemblies 9, 10 and 11, with the side lights 1b and 1b', taillights 1e and 1e', license light 1e, and stop light 1f and 1f being first connected to each other as single loads respectively. The wire assemblies 9, 10 and 11, especially the wire assembly 9, are formed into comparatively large wire harnesses in FIG. 3, i.e., a front wire harness 12a, a rear wire harness 12b and a wire harness 12c for the instrument panel or suitably formed into other small wire harnesses for efficient wiring.

Accordingly, in the wiring sytem shown in FIG. 3, if either one of the turn lights 1g and 1g' or 1h and 1h' is not illuminated due to breakage of wiring or the like, it is sufficient to examine only the wire harnesses, for example, the wire harnesses 12a and 12b connecting the turn lights 1g and 1g' and 1h and 1h' with the junction harness 5'.

It is to be noted that, although the present invention is mainly described with reference to the bonnet type motor vehicle in the above embodiment, the wiring system of the invention is not limited in its application to the bonnet type motor vehicle, but may be readily applicable to any other types of motor vehicles provided that there is a space for accommodating the junction harness therein.

Referring to FIG. 4, there is shown a modification of the embodiment of FIG. 3. In this modification, a control box 13 is further provided in a position close to the power source 3 and where many wires are distributed, for example, at the back of the engine compartment (not shown) or within the instrument panel (not shown), in which control box 13, the units 4a and 4b and the junction harness 5" are collectively disposed. In FIG. 4, the terminals 6' for the power source 3 and various loads 1 and the terminals 7' for the switches 2 described as provided on the junction harness 5' in the embodiment of FIG. 3 are respectively replaced by terminals 6" and 7" provided on the control box 13 for connecting thereto the terminals of the various loads 1, power source 3 and switches 2' through the independent single wires of the wire assemblies 9, 10 and 11, while the terminal 8' for the units 4a and 4b are provided on the junction harness 5' as in FIG. 3 for effecting complicated interconnections between the terminals 6" and 7" and the unit 4 within the junction harness 5" in a manner similar to that explained with the reference to FIG. 2. In the modification of FIG. 4, the side lights 1b and 1b', taillights 1e and 1e', license light 1e, and stop lights 1f and 1f described as first connected to each other as single loads respectively before being connected to the corresponding terminals of the junction harness 5' through the independent single wires of the wire assembly 9 in FIG. 3 are modified to be separately connected one by one to corresponding terminals of the control box 13 through independent single wires of the wire assembly 9 without being first connected to each other as single loads.

Since other structures and functions of the modified wiring system of FIG. 4 are the same as those of the wiring system of FIG. 3, detailed description thereof is omitted for brevity.

As is clear from the foregoing description, according to the wiring system of the present invention, since each of the terminals of various loads, switches, power source and units for electrical appliances of the motor vehicle is connected to a corresponding terminal of the junction harness one by one with independent single wires, tracing and examination of the wire harnesses during problem periods are remarkably facilitated, with improved trouble shooting efficiency. Furthermore, in the motor vehicles having particular specifications in which additional electrical appliances, for example, power window, air conditioning, car-stereo and the like are equipped, it is possible to employ the wiring system of the present invention as a fundamental arrangement, while the electrical appliances of the above described kinds are additionally provided in the conventional manner. Even in such cases, the wiring system of the present invention has a similar effect for simplification of wiring and facilitation of trouble shooting. Furthermore, if the fundamental arrangement is composed of loads, switches, units for electrical appliances necessary for all types of motor vehicles in the above case, junction harnesses common to different types of motor vehicles can be presented advantageously.

Moreover, the collective arrangements of various electrical units for the motor vehicle in the control box so as to effect the complicated interconnections between wires through the junction harness depending on the necessity within the control box is very effective not only for simplification and compact size of each wire harness, but for facilitation of repair work during problems, with consequent improvements of servicing for the users.

Although the present invention has been fully described by way of examples with reference to the attached drawings, it is to be noted that various changes and modifications are apparent to those skilled in the art. Therefore, unless otherwise such changes and modifications depart from the scope of the present invention, they should be construed as included therein.

What is claimed is:

1. A wiring system for a motor vehicle comprising:
   a vehicle body having a front end portion and a rear end portion;
   an instrument panel provided in a predetermined portion of said vehicle body;
   a first plurality of electrical load means provided in said front end portion of said vehicle body;
   a second plurality of electrical load means provided in said rear end portion of said vehicle body;
   a third plurality of electrical load means selectively provided on and near said instrument panel;
   a plurality of electrical switch means selectively provided on and near said insrument panel;
   an electrical power source provided in said vehicle body;
   a control unit means provided in said vehicle body including a plurality of control means each adapted for controlling at least one load means of said first, second and third plurality of electrical load means;

a first connecting means including a plurality of simple wires each connected only to a corresponding one of said first plurality of electrical load means;

a second connecting means including a plurality of simple wires each connected only to a corresponding one of said second plurality of electrical load means;

a third connecting means including a plurality of simple wires each connected only to a corresponding one of said third plurality of electrical load means;

a fourth connecting means including a plurality of pairs of simple wires each pair connected only to opposite ends of a corresponding one of said plurality of electrical switch means;

a fifth connecting means connected to said electrical power source;

a sixth connecting means including a plurality of groups of simple wires each simple wire of each group connected only to a corresponding terminal of a corresponding one of said plurality of control means of said control unit means;

a junction means including a first plurality of terminal means each connected to a corresponding one of said plurality of simple wires of said first connecting means;

a second plurality of terminal means each connected to a corresponding one of said plurality of simple wires of said second connecting means;

a third plurality of terminal means each connected to a corresponding one of said plurality of simple wires of said third connecting means;

a fourth plurality of terminal means associated in pairs, each terminal means of each pair connected to a corresponding simple wire of a corresponding pair of said plurality of pairs of simple wires of said fourth connecting means;

a fifth terminal means connected to said fifth connecting means;

a sixth plurality of terminal means associated in groups, each terminal means of each group connected to a corresponding simple wire of a corresponding group of said plurality of groups of simple wires of said sixth connecting means, a complex-crossed wire harness connected between said terminal means for connecting each electrical load means of said first, second and third plurality of electrical load means to said electrical power source through a corresponding one of said plurality of electrical switch means and a corresponding control means of said control unit means to define an effective circuit.

2. A wiring system for a motor vehicle as claimed in claim 1, further comprising a control box in which said junction means and said control unit means are disposed.

* * * * *